United States Patent
Sekhar et al.

(10) Patent No.: US 6,436,250 B1
(45) Date of Patent: Aug. 20, 2002

(54) SLURRY AND METHOD FOR PRODUCING REFRACTORY BORIDE BODIES AND COATINGS FOR ALUMINIUM ELECTROWINNING CELL APPARATUS

(75) Inventors: Jainagesh Akkaraju Sekhar, Cincinnati, OH (US); Jean-Jacques Duruz, Geneva (CH); James Jeng Liu, Cincinnati, OH (US)

(73) Assignee: Moltech Invent S.A. (LU)

( * ) Notice: Subject to any disclaimer, the term of this patent is extended or adjusted under 35 U.S.C. 154(b) by 0 days.

(21) Appl. No.: 09/284,524
(22) PCT Filed: Oct. 20, 1997
(86) PCT No.: PCT/US97/19067
§ 371 (c)(1), (2), (4) Date: Jun. 10, 1999
(87) PCT Pub. No.: WO98/17842
PCT Pub. Date: Apr. 30, 1998
(51) Int. Cl.$^7$ .............................. C25C 3/00; B01F 3/00; B05D 1/36
(52) U.S. Cl. ..................... 204/247.4; 252/302; 427/201
(58) Field of Search ........................... 204/243.1, 247.4; 205/230; 252/302; 427/201

(56) References Cited

U.S. PATENT DOCUMENTS 5,397,450 A  *  3/1995  Sekhar et al. ............ 204/243.1
5,753,163 A  *  5/1998  Sekhar et al. ................. 264/86
6,001,236 A  *  12/1999 de Nora et al. ......... 205/384 X

* cited by examiner

Primary Examiner—Donald R. Valentine
(74) Attorney, Agent, or Firm—Jayadeep R. Deshmukh

(57) ABSTRACT

A refractory boride body or coating made of a boride of titanium, chromium, vanadium, ziconium, hafnium, niobium, tantalum, molybednum and cerium is produced from a slurry of the refractory boride or a precursor in a collidal carrier preferably composed of two more different grades of the same colloidal carrier selected from colloidal alumina, yttria, ceria, thoria, zirconia, magnesia, lithia, monoaluminum phosphate and cerium acetate. The slurry can also comprise an organic additive selected from polyvinyl alcohol; polyacrylic acid; hydroxyy propyl methyl cellulose; polythylene glycol; ethylene glycol, butyl benzyl phthalate; ammonium polymethacrylate and mixtures thereof. The retractory boride body or coated body is useful as a component of aluminum electrowinning cells.

39 Claims, No Drawings

SLURRY AND METHOD FOR PRODUCING REFRACTORY BORIDE BODIES AND COATINGS FOR ALUMINIUM ELECTROWINNING CELL APPARATUS

FIELD OF THE INVENTION

The invention relates to the production of refractory boride coatings and bodies in particular for use in cells for the electrowinning of aluminium by the electrolysis of alumina dissolved in a molten electrolyte such as cryolite or other fluoride-based electrolytes. The invention more specifically relates to a slurry for producing refractory boride coatings and bodies, as well as bodies coated with or made of refractory boride for use as components of aluminium electrowinning cells.

BACKGROUND OF THE INVENTION

Aluminium is produced conventionally by the Hall-Heroult process, by the electrolysis of alumina dissolved in cryolite-based molten electrolytes at temperatures up to around 950° C. A Hall-Heroult reduction cell typically has a steel shell provided with an insulating lining of refractory material, which in turn has a lining of carbon which contacts the molten constituents. Conductor bars connected to the negative pole of a direct current source are embedded in the carbon cathode substrate forming the cell bottom floor. The cathode substrate is usually an anthracite based carbon lining made of prebaked cathode blocks, joined with a ramming mixture of anthracite, coke, and coal tar, or with glue.

It has long been recognized that it would be desirable to make (or coat or cover) the cathode of an aluminium electrowinning cell with a refractory boride such as titanium diboride that would render the cathode surface wettable to molten aluminium which in turn would lead to a series of advantages. Many difficulties were encountered in producing refractory boride coatings which meet up to the rigorous conditions in an aluminium electrowinning cell. However, as described in the following patents, such coatings have recently been successfully introduced.

U.S. Pat. No. 5,310,476 (Sekhar et al) discloses a method of producing a protective refractory coating on a substrate of, inter alia, carbonaceous materials by applying to the substrate a micropyretic reaction layer from a slurry containing particulate reactants in a colloidal carrier, and initiating a micropyretic reaction. The micropyretic slurry optionally also contains some preformed refractory material, and the znicropyretic slurry may be applied on a non-reactive sublayer.

U.S. Pat. No. 56364,513 (Sekhar et al) discloses a method of producing a protective refractory coating by applying to the substrate a reactive or non-reactive layer from a slurry containing particulate reactants and/or preformed particulate refractory materials in a colloidal carrier, and initiating a micropyretic reaction or non-reactive sintering. The colloidal carrier was selected from the group consisting of colloidal alumina, yttria, ceria, thoria, zirconia, magnesia, lithia, monoaluminum phosphate, cerium acetate and mixtures thereof. Various colloid mixtures were disclosed, such as colloidal alumina-colloidal silica and colloidal alumina-monoaluminium phosphate.

U.S. Pat. No. 5,651,874 (de Nora et al) discloses applying a protective coating of a refractory boride such as $TiB_2$ to a carbon component of an aluminium electrowinning cell, by applying thereto a slurry of particulate boride in a colloid in several layers with drying between each layer.

These coatings have shown outstanding performance compared to previous attempts to apply refractory coatings to components of aluminium electrowinning cells. These aluminium-wettable refractory boride coated bodies can be used in conventional cells with a deep aluminium pool and also permit the elimination of the thick aluminium pool required to partially protect the carbon cathode, enabling the cell to operate with a drained cathode.

These refractory boride coated bodies have the following attributes: excellent wettability by molten aluminium, inertness to attack by molten aluminium and cryolite, low cost, environmentally safe, ability to absorb thermal and mechanical shocks, durability in the environment of an aluminium production cell, and ease of production and processing. The boride coating also acts as a barrier to sodium penetration.

The refractory boride coated bodies find many applications on account of their excellent resistance, protection, and stability when exposed to the corrosive conditions existing in the cell even when the temperature of operation is low as in the Low Temperature electrolysis process for the production of aluminium, see for example U.S. Pat. No. 4,681,671 (Duruz).

For most applications, thin coatings (less than 1 mm thick) are required and the methods for applying such thin coatings in one or more layers from a slurry in a colloidal carrier have proven to be essentially problem-free. Nevertheless, for some special applications, for example coating certain types of drained-cathode surfaces, it would be desirable to have thicker coatings.

When, however, it was attempted to produce thicker coatings, some problems were encountered, in particular undesirable mud-cracking was found to occur in the finished, dried coating when the coating thickness exceeded about 1 mm or even only 0.8 mm depending on the coating formulation. mud-cracking involves cracks ranging in width from 0.1 mm to 1 mm Hairline cracks, typically less than 0.1 mm, (generally from 0.03 to 0.09 mm) are also formed but are more acceptable.

Despite this problem of mud-cracking as the thickness increases, the coatings of U.S. Pat. No. 5,651,874 (de Nora et al) remain outstandingly the best available industrially-applicable coatings.

In WO 97/08114 (Sekhar et al.) filed Aug. 21, 1996, priority U.S. Ser. No. 08/519,711 of Aug. 28, 1995, now U.S. Pat. No. 5,753,163 which constitutes prior art under PCT Rule 33.1 (c), it has been proposed to make bodies of refractory boride, for example by slip casting or pressing a slurry of particulate boride in a colloid.

SUMMARY OF THE INVENTION

The invention sets out to improve the production of refractory boride coatings or bodies for use as cell components for aluminium electrowinning cells, especially for use as cathodes.

One object of the invention is to provide an improved slurry for the production of bodies or coatings of refractory boride.

Another object of the invention is to produce refractory boride coated bodies and refractory boride bodies starting from readily available and relatively inexpensive commercial particulate borides or their precursors in a specific colloidal carrier.

A specific object of the invention is to produce bodies coated with refractory borides with coating thicknesses equal to or greater than those previously possible, without mud-cracking, the coatings being aluminium-wettable and electrically conductive so they can serve as coatings for cathodes or other cell components of aluminium production cells.

In the production of "thick" refractory boride coatings, it has been discovered that the mud-cracking problem can be alleviated by utilizing specific colloidal carriers. Moreover, it has been observed that these specific colloidal carriers are also advantageous when producing normal "thin" coatings and even more advantageous when producing bodies of refractory borides, as opposed to coatings.

According to one main aspect of the invention, a slurry for the production of bodies or coatings of refractory boride comprises particulate preformed refractory boride and/or particulate precursors of refractory boride in a colloidal carrier which comprises colloidal particles with a non-gaussian particle size distribution, comprising a mixture of at least two different grades of the same colloid having mean particle sizes which differ from one another, each grade of colloid having a generally gaussian particle size distribution.

In contrast to the known colloid mixtures of different colloidal components (colloidal alumina and colloidal silica, for example) this colloidal carrier according to the invention is obtainable by mixing two different "grades" of the same colloid, producing a desirable particle size distribution.

"Grade" is to be understood as a range of particle sizes of the colloidal particles, with the mean particle size and at least 50% of the particles within that particular range. Commercially available colloids have a predominant particle size with generally gaussian particle size distribution.

Use of this bi- or multigrade colloidal carrier, advantageously in combination with an organic additive, provides an unexpected combination of properties, namely better homogeneity/bonding without cracking and enhanced protection against sodium penetration when the coating or body is used as a component in an aluminium production cell. Moreover, the slurry with this mixed colloidal carrier has improved thixotropic properties, in particular it remains in suspension much longer than standard colloids, which leads to significant cost savings. The thixotropic mix minimizes sedimentation of the refractory boride powders and the aged dispersion does not result in dense sediments. The slurry with the mixed colloid thus remains stable, providing increased shelf life, while remaining easy to apply, for example by brushing. Surprisingly, use of the modified colloidal carrier also leads to a lowering of the resistivity of the coating or body, thereby increasing the cell efficiency.

It should be noted that mixing of different types of colloids is not normally to be recommended because physical and chemical reactions may take place resulting in coagulation, flocculation, rise in pH or irreversible gelation. In the colloid mixture according to the invention, one colloid will generally be of the polymeric type, and the other non-polymeric.

Usually, two distinct fractions of colloidal particles have mean particle sizes which differ from one another by 10–50 nanometers, and the slurry can include a first fraction of colloidal particles with a mean particle size in the range 5–50 nanometers (e.g. 10–30 nanometers), and a second fraction of colloidal particles with a mean particle size in the range 30–100 nanometers (e.g 40–60 nanometers). This slurry optionally further includes a third distinct fraction of colloidal particles with a mean particle size in the range 100–250 nanometers The first and second particle fractions of the slurry can be in a volume ratio from 10:6 to 10:16, for example from 10:8 to 10:14 or more particularly from 10:10 to 10:12, i.e by volume of the colloids in the mixture.

In another aspect, the slurry according to the invention comprises 30–50 volume% of colloids with a mean particle size less than 20–40 nanometers and 70–50 volume% of colloids with a mean particle size greater than 20–40 nanometers. For example the colloid can contain 30–50 volume%, say about 40 volume%, of colloids with a mean particle size less than about 30 nanometers and 70–50 volume%, say about 60 volume% of colloids with a mean particle size greater than about 30 nanometers.

In advantageous embodiments, the colloids contain particle fractions wherein the largest fraction has a mean diameter of 60 nanometres, or even 50 nanometres. Such colloids contain a large spread of particles with diameters less than 50 nanometres.

The slurry's colloidal carrier is usually selected from the group consisting of colloidal alumina, yttria, ceria, thoria, zirconia, magnesia, lithia, monoaluminum phosphate, cerium acetate and mixtures thereof. Normally, however, the colloidal particles of the colloidal carrier are all particles of the same colloid. It is surprising that a mixture of one colloid, say colloidal alumina, obtainable by mixing together two grades of colloidal alumina with different mean particle sizes, is advantageous compared to the individual grades.

The colloidal carrier is usually in an aqueous medium but, advantageously, the slurries of the present invention also include at least one organic additive selected from the group consisting of polyvinyl alcohol, polyethylene glycol, ethylene glycol, polyacrylic acid, hydroxy propyl methyl cellulose, butyl benzyl phthalate and aluminium polymethacrylate.

The colloid may be derived from colloid precursors and reagents which are solutions of at least one salt such as chlorides, sulfates, nitrates, chlorates, perchlorates or metal organic compounds such as alkoxides, formates, acetates of aluminium, silicon, yttrium, cerium, thorium zirconium, magnesium and lithium. These colloid precursors or colloid reagents can contain a chelating agent such as acetyl acetone or ethylacetoacetate. The aforesaid solutions of metal organic compounds, principally metal alkoxides, can be of the general formula $M(OR)_z$ where M is a metal or complex cation, R is an alkyl chain and z is a number, preferably from 1 to 12.

It is also possible to include further components in the colloidal slurry, for example powdered aluminium which improves the conductivity of the resulting coating or body.

The pre-formed particulate refractory boride is usually selected from borides of titanium, chromium, vanadium, zirconium, hafnium, niobium, tantalum, molybdmenum and cerium. The preferred particulate refractory boride is titanium diboride.

When choosing the refractory boride powder, the particle size selection is of some importance. It is preferable to choose particle size below 100 micrometers and to choose particle sizes which are varied. For example it is preferable to choose particle sizes extending over a range where the smallest particles are at least two times and preferably at least three times smaller than the large ones. Generally, the ratio of the particle sizes will be in the range from 2:1 to 15:1, usually from about 3:1 to 10:1, for instance a ratio of about 3:1 with large particles in the range 15 to 30 micrometers and small particles in the range 5 to 10 micrometers, or a ratio of about 10:1 with large particles in the range from 30 to 50 micrometers and small particles in the range from 3 to 5 micrometers. Usually, the preformed particulate metal boride has particles with sizes in the range from about 3 micrometers to about 50 micrometers.

It has been ascertained that the choice of the particle size of the metal boride influences the maximum thickness obtainable without mud-cracking and, for all types and mixtures of the refractory boride, use of the mixed colloidal carrier according to the invention increases the maximum obtainable thickness without mud-cracking. Mud-crack-free coatings up to 4, 6 or even 8 mm thick can thus be achieved.

The slurry usually contains 5–100 g of the pre-formed particulate refractory boride per 10 ml of colloid and each colloid has a dry colloid content corresponding to up to 50 weight % of the colloid plus liquid carrier, preferably from 5 to 30 weight %, the optimum being from 7–20 weight %.

The Method

According to the invention, there is provided a method of applying a refractory boride to a component of a cell for the production of aluminium by the electrolysis of alumina dissolved in a cryolite-based molten electrolyte, to protect the component from attack by liquid and/or gaseous components of the electrolyte in the form of elements, ions or compounds, the method comprising applying to the surface of the component the previously described mixed bi- or multigrade slurry and drying the coated surface. All previously-described features of the slurry are applicable in the method, such as the inclusion of an organic additive.

The invention also provides a method of producing a body coated with a refractory boride from the group consisting of the borides of titanium, chromium, vanadium, zirconium, hafnium, niobium, tantalum, molybdenum and cerium. The coating according to the invention includes a refractory boride containing a specific grade of colloidal binder or preferably at least two colloids, selected from the group consisting of colloidal alumina, silica, yttria, ceria, thoria, magnesia, lithia, monoaluminium phosphate and cerium acetate, each said colloid having a different grade, and is obtained from a slurry of particulate refractory boride in one or more of said colloids, by forming and drying the slurry.

Drying of the slurry is followed by heat treatment before or after the component is installed in an aluminium production cell.

The slurry is usually applied in several layers, for example by brushing, by roller or spraying, each layer being allowed to dry at least partially in the ambient air or assisted by heating before applying the next layer, followed by a final heat treatment to dry the slurry after application of the last layer. Heating at a temperature from 80 to 300° C. can for example be carried out each time an added thickness of about 0. 2 to about 0 6 mm is reached by the application of one or more layers.

The resulting coating of refractory boride usually has a dried thickness up to 8.0 mm without mud-cracking Another aspect of the invention is a method of producing a self-sustaining body of a refractory boride preferably from the group consisting of the borides of titanium, chromium, vanadium, zirconium, hafnium, niobium, tantalum, molybdenum and cerium, in which the body includes a refractory boride and a colloid preferably from the group consisting of colloidal alumina, silica, yttria, ceria, thoria, zirconia, magnesia, lithia, monoaluminium phosphate and cerium acetate, and is obtained from the previously-described slurry of the invention containing preformed refractory boride, by forming and drying the slurry.

For example, the slurry is cast into a die or mold on a porous layer and the cast slurry is allowed to dry by draining the liquid through the porous layer. Further methods of forming bodies of refractory boride from slurries are disclosed in WO 97/08114 (Sekhar et al.).

To assist rapid wetting by molten aluminium, the bodies made of or coated with refractory borides may be exposed to molten aluminium in the presence of a flux assisting penetration of aluminium into the refractory boride, the flux for example comprising a fluoride, a chloride or a borate, of at least one of lithium and sodium, or mixtures thereof. Such treatment favors aluminization of the surface of the body by the penetration therein of aluminium.

The invention also applies to methods of producing bodies or coatings from a slurry according to the invention which contains, instead of or in addition to particulate preformed refractory boride, precursor powders which react to form the refractory boride(s). For instance titanium and boron powders can be reacted in the presence of preformed titanium diboride which moderates the reaction.

Numerous examples of micropyretic reaction mixtures for this purpose are described in the aforementioned U.S. Pat. Nos. 5,310,476 and 5,364,513 (both Sekhar et al.), the disclosures whereof are incorporated herein by way of reference.

Cell Components

The invention also concerns cell components of aluminium production cells, in particular those which in use of the cell are exposed to contact with molten cryolite and/or molten aluminium. The cell component is for instance a cathode or forms part of a cathodic cell bottom, or may be a tile or a component such as a weir or a baffle or grid immersed in the molten aluminium.

According to the invention, there is provided a component of a cell for the production of aluminium by the electrolysis of alumina dissolved in a cryolite-based molten electrolyte, which cell component is subjected to molten cryolite and/or to molten aluminium. The cell component comprises a body or a coating made from the slurry of the present invention.

In the case of components coated with the refractory boride, the main body or substrate of the component will often be made of carbon or of a carbon-containing composite. It is also possible to coat refractory substrates, such as various types of alumina or other refractory oxy compounds as well as composite materials comprising an electrically conductive and an electrically non-conductive component.

For example, a body can be made including titanium diboride as the reaction product of titanium oxide, boron oxide and aluminium from a slurry according to the invention and/or coated with a refractory boride such as titanium diboride by the method of the invention.

Usually, the component will have a porous surface, which is the case for carbon, but coatings can also be applied successfully to essentially impervious substrates.

The component may be a current-carrying component for example a cathode, a cathode current feeder, or the cathodic part of a bipolar electrode. Particular advantages are achieved for drained cathodes where the produced aluminium continuously drains from the cathode surface which is a made of refractory boride or coated with a relatively thick and crack-free coating of refractory boride according to the invention.

The bodies may consist of blocks or tiles that can be fitted together to form a cell bottom of an aluminium production cell, which acts to carry current to the cathodic pool if there is one, or to a thin layer of aluminium in drained cells, or they may form a packed bed of bodies on a cell bottom.

The component advantageously forms part of a cathode through which the electrolysis current flows, the refractory boride cathodic surface being in contact with the cathodically-produced aluminium. For example, it is part of a drained cathode wherein the refractory boride forms the cathodic surface on which the aluminium is deposited cathodically, the component's drained surface being arranged usually upright or at a slope to assist draining of the aluminium. Arrangements with a horizontal drained surface are also possible.

For example, providing a "thick" and crack-free refractory boride coating according to the invention is very advantageous when applied to a drained-cathode grid as described in U.S. Pat. No. 5,472,578 (de Nora).

Electrolyte Cells and Operation

The invention also relates to an aluminium electrowinning cell comprising a cell component including a body or coating as discussed above as well as a method of producing aluminium using such cells and methods of operating the cells.

Such cells may comprise a component which in operation of the cell is exposed to molten cryolite or aluminium, said component including a body or coating as discussed above, wherein the product aluminium is in contact with the refractory boride, which may be a cathode or form part of a cathodic cell bottom.

A method of operating the cells comprises producing a cell component which includes a body or a coating made from a slurry as described above; optionally subjecting the coated component to heat treatment; placing the component in the cell so that it will be contacted by the cathodically produced aluminium, and/or the molten electrolyte; and operating the cell to produce molten aluminium.

As mentioned previously, in the case of cell components coated with the refractory boride, the main body or substrate of the component can be made of carbon or of a carbon-containing composite or a refractory material as well as composite materials comprising an electrically conductive and an electrically non-conductive component.

Advantageously, the cell includes a component comprising a body including titanium diboride as the reaction product of titanium oxide, boron oxide and aluminium using a slurry according to the invention and/or coated with a refractory boride by the method of the invention.

The cell component may be a current-carrying component for example a cathode, in particular a drained cathode.

Operation of the cell can be at normal operating temperatures (about 950° C.) or in a low temperature process, with the molten fluoride-based electrolyte containing dissolved alumina at a temperature below 900° C., usually at a temperature from 680° C. to 880° C. The low temperature electrolyte may be a fluoride melt or a mixed fluoride-chloride melt. This low temperature process is operated at low current densities on account of the low alumina solubility.

DETAILED DESCRIPTION

The invention will be further described in the following Examples.

EXAMPLE I

A slurry was prepared from a dispersion of 25 g $TiB_2$, 99.5% pure, −325 mesh (<42 micrometer), with 7 ml of one grade of colloidal alumina (NYACOL® Al-20, a milky liquid with a colloidal particle size grade of about 40 to 60 nanometers, i.e. mean particle size in the range 40 to 60 nanometers) and 6 ml of another grade of colloidal alumina (CONDEA® 10/2 Sol, a clear, opalescent liquid with a colloidal particle size grade of about 10 to 30 nanometers, ie mean particle size in the range 10 to 30 nanometers).

Carbon cathode samples measuring 50×20 mm were prepared, coated with the above slurry and allowed to dry naturally. The slurry was easy to apply by brush. The slurry was gel-free for a period of at least 5 days after preparation, which is considerably longer than for the individual grades of colloid.

The dried coatings were adherent and mud-crack free with thicknesses of about 0.80 mm The thickness of the coatings can be increased without causing mud-cracking by applying multiple layers and drying the layers prior to application of the next layer at a temperature ranging from 80 to 300° C. Preferably, the drying is undergone after each applied layer as a thickness from about 0.2 to 0.7 mm, preferably from 0.3 to 0.6 mm. Alternatively, for multi-layer coatings, each layer of slurry can be allowed to dry for several minutes before applying the next with optionally a final drying by baking in an oven or with warm air at 100–150° C.

Various $TiB_2$; powders selected from Advanced Ceramics "HCT-30", Advanced Refractory Technologies Inc "TGF", and Starck Grades "C" and "D", were used in the slurries. Mud-crack free coatings 4.0 to 6.0 mm thick were obtainable depending on the type of $TiB_2$ used (best results with Starck Grade "C").

Instead of a single grade of $TiB_2$, advantageously at least two grades of $TiB_2$ may be used, each with differing particle sizes. The use of a mixture of $TiB_2$ powders assists preventing the onset of mud-cracking of thick coatings.

The amount of $TiB_2$ in the slurry was varied from 20 to 30 g and the amount of the colloidal alumina mixture was varied from 10–20 ml total (from 3–10 ml of the NYACOL and from 3–10 ml of the CONDEA). For more dilute slurries a longer drying time was required. For all coatings excellent adhesion to carbon, excellent strength and excellent resistivity was noted.

A coated carbon body produced as above, was subjected to heat treatment at 1250° C. for 10 hours under argon, and subjected to a sodium penetration test by connecting it as a cathode in a NaF/NaCl bath (67.7 wt %/32.3 wt %) at 720° C. for 4.5 hours at a current density of 0.15 A/cm². Non-coated carbon cathodes subjected to the same treatment show signs of deterioration due to sodium penetration. Improved sodium resistance was obtained the greater the amount of the larger particle size colloid compared to the lower particle size.

The green strength of the coatings or bodies was found to improve the greater the amount of the smaller particles compared to the larger particles.

Overall, best results were obtained with a volume ratio of the CONDEA (smaller colloidal particles) to NYACOL (larger colloidal particles) in the ratio 10:10 to 10:12.

EXAMPLE II

Comparative

A slurry was prepared from a dispersion of 25 g $TiB_2$, 99.5% pure, −325 mesh (<42 micrometer), per 10 ml of colloidal alumina containing about 20 weight % of solid alumina, using the same NYACOL or CONDEA grade as in Example I, but singly and not mixed. If several coats were applied, as in Example I, each layer of slurry was allowed to dry for several minutes before applying the next, with an optional final drying by baking in an oven at 100–150° C. Coating thicknesses of about 0.15 to about 0.55 mm were obtainable without mud-cracking, however, for thicker coatings, mud-cracking was observed.

The $TiB_2$ in the slurry was varied from 5 to 15 g and the colloidal alumina was varied from 10–40 ml. For more dilute slurries a longer drying time was required. Increasing the colloidal alumina content increases the electrical resistivity by increasing the volume percentage of non-conducting material in the sample.

After the sodium-resistance test as in Example I, the non mud-cracked "thin" samples showed no sign of deterioration and were wetted by aluminium. However, the sodium resistance was not as good as the coating of Example 1. The thicker mud-cracked samples displayed inferior performance.

EXAMPLE III

In order to obtain improved coatings without mud-cracks (in particular to enable use of lesser-performing grades of $TiB_2$ and to reduce the need to use two grades of $TiB_2$) certain organic additives were added to the slurry of Example I. The organic additives tested were: polyvinyl alcohol; polyacrylic acid; hydroxy propyl methyl cellulose; polyethylene glycol; ethylene glycol; butyl benzyl phthalate; and ammonium polymethacrylate. The results are reported in Table I below.

The slurry is then coated onto cathode samples as in Example I or slip cast into block-shaped samples.

The electrical resistivity of block samples was measured by the four point probe method according to the ASTH C611-84 standard, both for the green body and after bonding by heat treatment ("sintering"). A constant current of 1 ampere (generated by a Keithly™ 228A voltage/current apparatus) was passed through the sample and the voltage drop recorded.

The flexural strength of the green and "sintered" composite samples was measured by the four point bending test, performed with an Instron™ 4206 machine according to the standard method from the ASTM mechanical property handbook. The crosshead speed of loading was kept at a constant rate of 0.1 mm/min for all samples.

For measurement of the interfacial bonding strength, the "sintered" samples were arranged precisely under the Instron-4206 machine. A small load was applied with the crosshead speed at 1 mm/win. The maximum load was recorded for the calculation of the interfacial bonding strength by strength (S)=F (maximum load)/πdh (Area).

All of the mixed-colloid slurries of Examples I and IV were found to be non-Newtonian, and the viscosity of the slurry is noted to decrease with an increasing shear rate.

Surprisingly and unexpectedly, the electrical resistivity of the green composites was found to be lower (better) and the strength was found to be higher (better). The green resistivity for the CONDEA Disperal 25/5 based slurry composite alone was found to be unexpectedly high. Similar results were obtained for the "sintered"(2 hours at 900° C.) composites as well.

| Powder | Coating Thickness (mm) | Weight load (g/cm$^2$) | Room dry | 200° dry | Average flexural strength, (MPa.) (baked at 900° C. for 2 hours) | Electrical Resistivity ($\mu\Omega$m) | | |
|---|---|---|---|---|---|---|---|---|
| | | | | | | 25° C. dried | 200° C. dried | 900° C. baked |
| Example I + 1 ml PEG400 | Approx. 1.7 | Approx. 0.40 | no crack | no crack | 3.58 | high | 2889 | 108 |
| Example I + 0.5 ml PEG400 | Approx. 2.0 | Approx. 0.49 | no crack | no crack | 6.72 | 5667 | 1297 | 30 |
| Example I + 0.25 ml PEG400 | Approx. 1.8 | Approx. 0.50 | no crack | no crack | 8.92 | 2519 | 1036 | 25 |
| Example I + 0.25 ml PEG400 | Approx. 1.8 | Approx. 0.45 | no crack | hairline crack | | | | |
| Example I + 0.25 ml PEG300 | Approx. 1.6 | Approx. 0.40 | no crack | no crack | 10.52 | 4572 | 1182 | 31 |
| Example I + 0.25 ml PEG200 | Approx. 1.9 | Approx. 0.38 | no crack | no crack | 8.85 | 2845 | 1545 | 28 |
| Example I + 0.5 ml EG | Approx. 1.4 | Approx. 0.20 | no crack | hairline crack | 5.87 | high | 7700 | 116 |
| Example I + 0.5 ml Santicizer | Approx. 2.4 | Approx. 0.30 | no crack | no crack | | | | |
| Example I + 1 ml MC (1%) | Approx. 2.4 | Approx. 0.35 | no crack | hairline crack | | | | |
| Example I + 0.5 ml MC (2%) | Approx. 1.0 | Approx. 0.20 | no crack | hairline crack | | | | |
| Example I + 0.5 ml DAXAD 32 | Approx. 2.4 | Approx. 0.40 | no crack | hairline crack | | | | |

PEG400 = CARBOWAX PEG400, UNION CARBIDE; MC = Methocel by DOW Chemical
PEG300 = CARBOWAX PEG300, UNION CARBIDE; DAXAD 32 = Ammonium polymethacrylate by WRGrace Co.
PEG300 = CARBOWAX PEG200, UNION CARBIDE; EG = Ethylene Glycol by FISHER Co.
Santicizer 261 = Butyl benzyl phthalate by MONSANTO; Weight load g/cm$^2$- gms of dry $TiB_2$ per surface area in g/cm$^2$

EXAMPLE IV

A slurry was prepared from a dispersion of $TiB_2$ powder, −325 mesh (<42 micrometer), in colloidal alumina (CONDEA) ranging from particle size grades of 15 nanometers through 200 nanometers consisting of a mixture of three grades (Grade 10/2, mean particle size in the range 10–30 nanometers; Grade 20/2, mean particle size in the range 30–50 nanometers; Grade 25/5, mean particle size in the range 170–230 nanometers). Comparative samples were made with the individual grades of colloid. The slurry was prepared by mixing the $TiB_2$ powder with the colloidal alumina. All the slurries are made with about 9 weight percent colloidal alumina and the rest $TiB_2$ powder.

For coated samples, interfacial bonding strengths were observed to be very low for the CONDEA Disperal Grade 25/5 based slurry alone. The Grade 20/2 based slurry displayed the best interfacial bonding strength.

The slurries with a mixture of the Grades 10/2 and 20/2 colloidal alumina and a mixture of Grades 10/2, 20/2 and 25/5 colloidal alumina showed best all round properties: no mud-crack formation, low electrical resistivity and good interfacial bonding.

It will be understood that modifications may be made in the present invention without departing from scope of the following claims.

EXAMPLE V

The slurry of Example I was cast into a rectangular die on a plaster of Paris base and was allowed to dry in ambient conditions by draining of the liquid through the plaster. After drying for several hours, the ngreenw body was removed from the die. It formed a self-sustaining body which was then subjected to heat treatment at 1200° C. for 24 hours under Argon. The resulting body of $TiB_2$ bonded by the dried colloid was mechanically stronger than a comparable body made by slip casting a slurry with the individual grades of colloid and its electrical resistivity was lower. This slip-casting procedure was much more convenient using the mixed-colloid slurry according to the invention, than when using a slurry with the individual grades of colloid.

What is claimed is:

1. A slurry for the production of bodies or coatings of refractory boride, the slurry comprising particulate pre-formed refractory boride and/or particulate precursors of refractory boride in a colloidal carrier, wherein the colloidal carrier comprises colloidal particles with a non-gaussian particle size distribution, comprising a mixture of at least two different grades of the same colloidal having mean particles sizes which differ from one another, each grade of colloidal having a generally gaussian particle size distribution.

2. The slurry of claim 1, wherein said two different grades of colloidal particles have mean particles sizes which differ from one another by 10–50 nanometers.

3. The slurry of claim 2, wherein said two different grades of colloidal particles have mean particle sizes which differ from one another by 10–30 nanometers.

4. The slurry of claim 2, including a first grade of colloidal particles with a mean particle size in the range 5–50 nanometers, and a second grade of colloidal particles with a mean particle size in the range 30–100 nanometers.

5. The slurry of claim 4, including a first grade of colloidal particles with a mean particle size in the range 10–30 nanometers, and a second grade of colloidal particles with a mean particle size in the range 40–60 nanometers.

6. The slurry of claim 5, wherein the first and second particle grade are in a volume ratio from 10:10 to 10:12.

7. The slurry of claim 4, further including a third different grade of colloidal particles with a mean particle size in the range 100–250 nanometers.

8. The slurry of claim 4, wherein the first and second particle grade are in a volume ratio from 10:8 to 10:14.

9. The slurry of claim 1, wherein the first and second particle grade are in a volume ratio from 10:6 to 10:16.

10. The slurry of claim 1, wherein the colloidal carrier is selected from the group consisting of the colloidal alumina, yttria, ceria, thoria, zirconia, magnesia, lithia, monoaluminum phosphate, cerium acetate and mixtures thereof.

11. The slurry of claim 1, wherein the pre-formed particulate refractory boride is selected from borides of titanium, chromium, vanadium, zirconium, hafnium, niobium, tantalum, molybdenum and cerium.

12. The slurry of claim 11, wherein the pre-formed particulate refractory boride is titanium diboride.

13. The slurry of claim 12, wherein the colloidal carrier is colloidal alumina.

14. The slurry of claim 1, comprising 5–100 g of the pre-formed particulate refractory boride per 10 ml of total colloid.

15. The The slurry of claim 1, wherein the colloid has a dry colloid content corresponding to up to 50 weight % of the colloid plus liquid carrier.

16. The slurry of claim 15, wherein the colloidal carrier has a dry colloid content corresponding to from 5 to 30 weight % of the colloid plus liquid carrier.

17. The slurry of claim 1, further comprising an organic additive selected from the group consisting of polyvinyl alcohol; polyacrylic acid; hydroxy propyl methyl cellulose; polyethylene glycol; ethylene glycol; butyl benzl phthalate; ammonium polymethacrylate and mixtures thereof.

18. The slurry of claim 1, wherein the mean particle size of all colloidal particles in the colloidal carrier is in the range from about 15 to about 50 nanometers.

19. The slurry of claim 1, comprising at least two different particle size grades of particulate refractory boride.

20. A component of a cell for the production of aluminium by the electrolysis of alumina dissolved in a cryolite-based molten electrolyte, which cell component is made of or coated with refractory boride obtained from the slurry of claim 1, the refractory boride being bonded with at least two different grades of colloidal particles having mean particle sizes which differ from one another.

21. The component of claim 20, wherein the colloidal carrier is selected from the group consisting of colloidal alumina, yttria, ceria, thoria, zirconia, magnesia, lithia, monoaluminum phosphate, cerium acetate and mixtures thereof.

22. The component of claim 20, wherein the particulate refractory boride is selected from borides of titanium, chronium, vanadium, zirconium, hafnium, niobium, tatalum, molybdenum and cerium.

23. The component of claim 22, wherein the pre-formed particulate refractory boride is titanium diboride.

24. The component of claim 23, wherein said colloid is colloid alumina.

25. The component of claim 20, wherein the two colloidal carriers have mean colloidal particle sizes which differ from each other by 10–50 nanometers.

26. The component of claim 20, wherein the coating further comprises an organic additive selected from the group consisting of polyvinyl alcohol; polyacrylic acid; hydroxy propyl methyl cellulose; polyehtylene glycol; ethylene glycol; butyl benzyl phthalate; ammonium polymethacrylate and mixtures thereof.

27. The component of claim 20, comprising a non mud-cracked coating of refractory boride having a dried thickness up to 8.0 mm.

28. The component of claim 20, wherein the mean particle size of all colloidal particles in the colloidal carrier is in the range from about 15 to about 50 nanometers.

29. The component of claim 20, which comprises a carbon-containing body coated with a refractory boride coating.

30. The component of claim 20, which is a cathode or forms part of or is fitted on a cathodic cell bottom.

31. A method of applying a refractory boride to a component of a cell for the production of aluminium by the electrolysis of alumina dissolved in a cryolite-based molten electrolyte, to protect the component from attack by liquid and/or gaseous components of the electrolyte in the form of elements, ions or compounds, the method comprising applying to the surface of the component a slurry comprising particulate preformed refractory boride and/or particulate presecutors of refractory boride in a colloidal carrier, wherein the colloidal carrier comprises colloidal particles with a non-gaussian particle size distribution, comprising a mixture of at least two different grades of the same colloid having mean particle sizes which differ from one another, each grade of colloid having a general gaussian particle size distribution and drying said coated surface.

32. The method of claim 31, wherein the drying is followed by heat treatment before or after the component is installed in an aluminium production cell.

33. The method of claim 31, wherein the slurry is applied in several layers, each layer being allowed to dry at least partially in the ambient air or assisted by heating before applying the next layer, followed by a final heat treatment to dry the slurry after application of the last layer.

34. The method of claim 31, comprising heating at a temperature from 100 to 300° C. each time added thickness of about 0.2 to about 0.6 mm is reched.

35. A method of producing a self-sustaining body of refractory boride from the group consisting of the borides of titanium, chromium, vanadium, zirconium, hafnium, niobium, tantalum, molybdenum and cerium, in which the body includes a refractory boride and a colloid from the group consisting of colloidal alumina, silica, yttria, ceria, thoria, zirconia, magnesia, lithia, monoaluminium phosphate and cerium acetate, said body being a component of a cell for the production of aluminium by the electrolysis of alumina dissolved in a cryolite-based molten electrolyte, to protect the component from attack by liquid and/or gaseous components of the electrolyte in the form of elements, ions, or compounds, said body being obtained from a slurry comprising particulate preformed retractory boride and/or particulate precursors of refractory boride in a colloidal carrier, wherein the colloidal carrier comprises colloidal particles with a non-gaussian particle size distribution, comprising a mixture of at least two different grades of the same colloid having mean particle sizes which differ from one another, each grade of colloid having a generally gaussian particle size distribution, said body being formed by forming and drying the slurry.

36. The method of claim 35, wherein, the slurry is cast into a die or mould on a porous layer and the cast slurry is allowed to dry by draining the liquid through the porous layer.

37. A self-sustaining body of refractory boride obtainable by the method of claim 35, the body comprising refractory boride particles bonded with colloidal particles comprising at least two different grades of colloidal particles having mean particle sizes which differ from one another.

38. An aluminium production cell comprising a component which in operation of the cell is exposed to molten cryolite or aluminium, which cell component is made of or coated with refractory boride obtained from a slurry comprising particulate preformed refractory boride and/or particulate precursors of refractory boride in a colloidal carrier, wherein the colloidal carrier comprises colloidal particles with a non-gaussian particle size distribution, comprising a mixture of at least two different grades of the same colloid having mean particle sizes differ one from another, the refractory boride being bonded with said at least two different grades of particles of the same colloid having mean particle sizes which differ from one another.

39. The aluminium production cell of claim 38, wherein said component is a cathode or forms part of or is fitted on a cathodic cell bottom.

* * * * *